April 4, 1939.  R. SCHULZ  2,153,101
CONTROL DEVICE FOR MACHINE TOOLS
Filed Oct. 27, 1937   6 Sheets-Sheet 1

Inventor:
Rudolf Schulz
By Watson, Coit, Morse & Grindle
ATTYS.

April 4, 1939.   R. SCHULZ   2,153,101
CONTROL DEVICE FOR MACHINE TOOLS
Filed Oct. 27, 1937   6 Sheets-Sheet 2

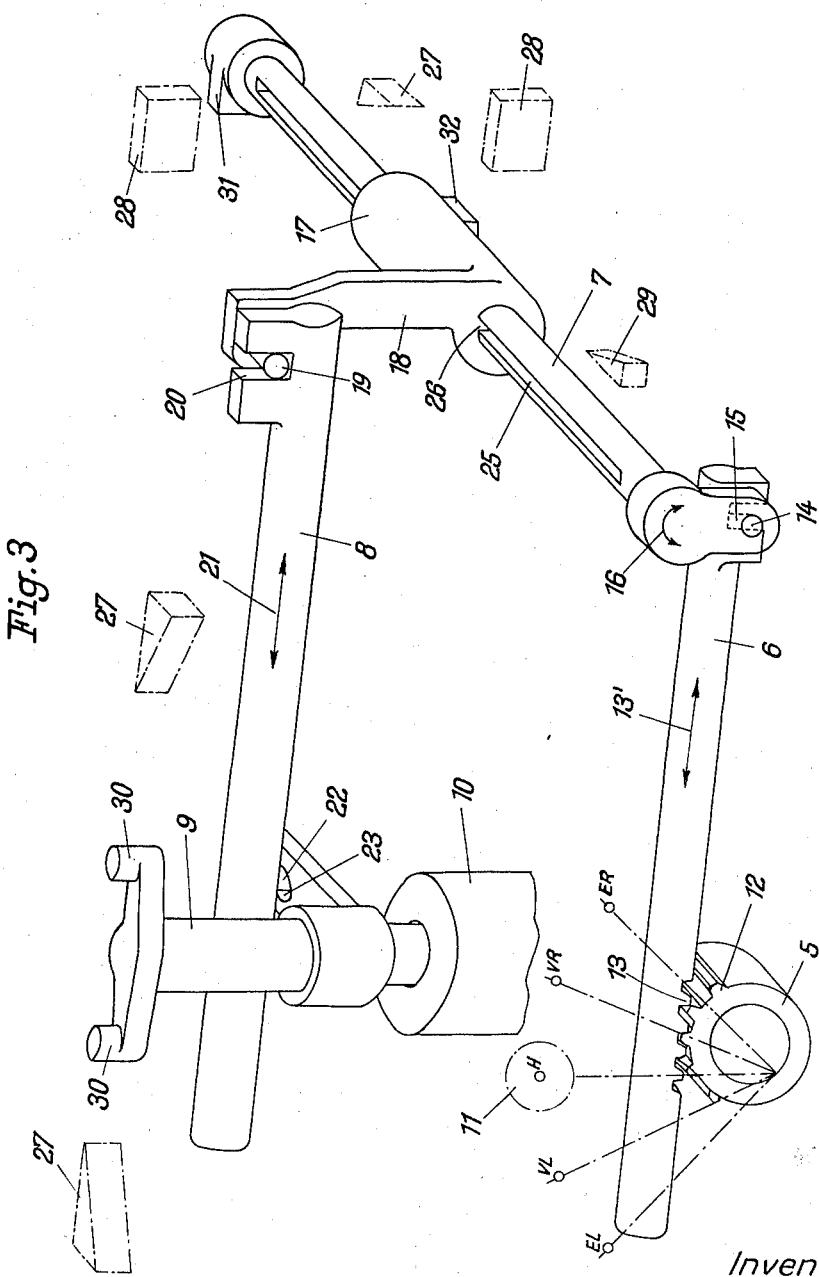

April 4, 1939. R. SCHULZ 2,153,101
CONTROL DEVICE FOR MACHINE TOOLS
Filed Oct. 27, 1937 6 Sheets-Sheet 4
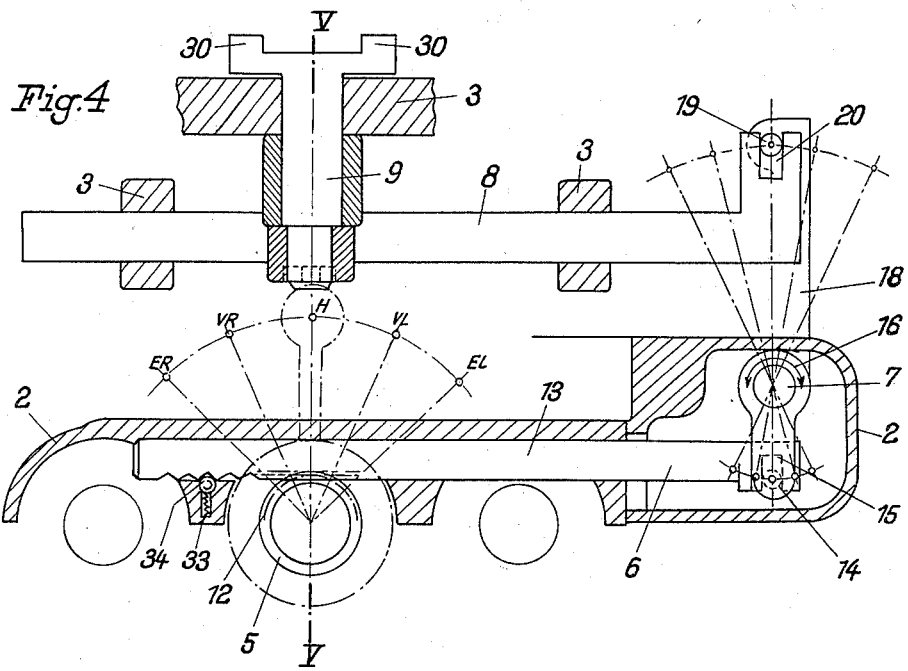
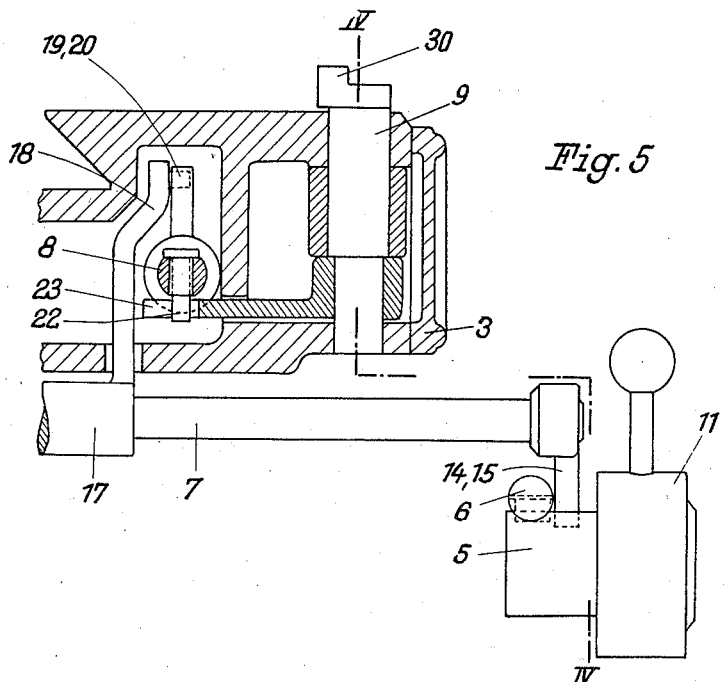
Inventor:
Rudolf Schulz
By Watson, Coit, Morse & Grindle
ATTYS.

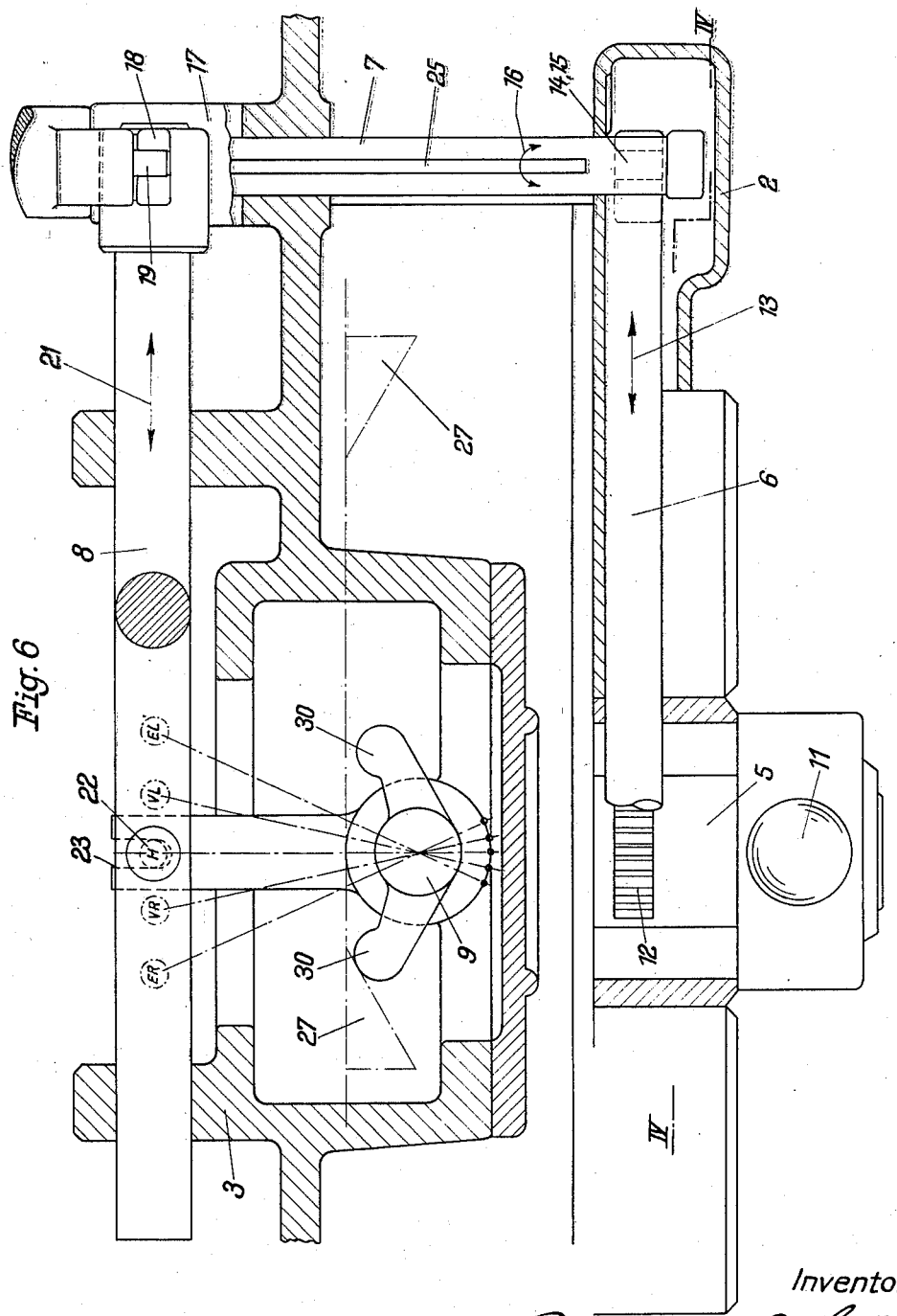

April 4, 1939. R. SCHULZ 2,153,101
CONTROL DEVICE FOR MACHINE TOOLS
Filed Oct. 27, 1937 6 Sheets-Sheet 6
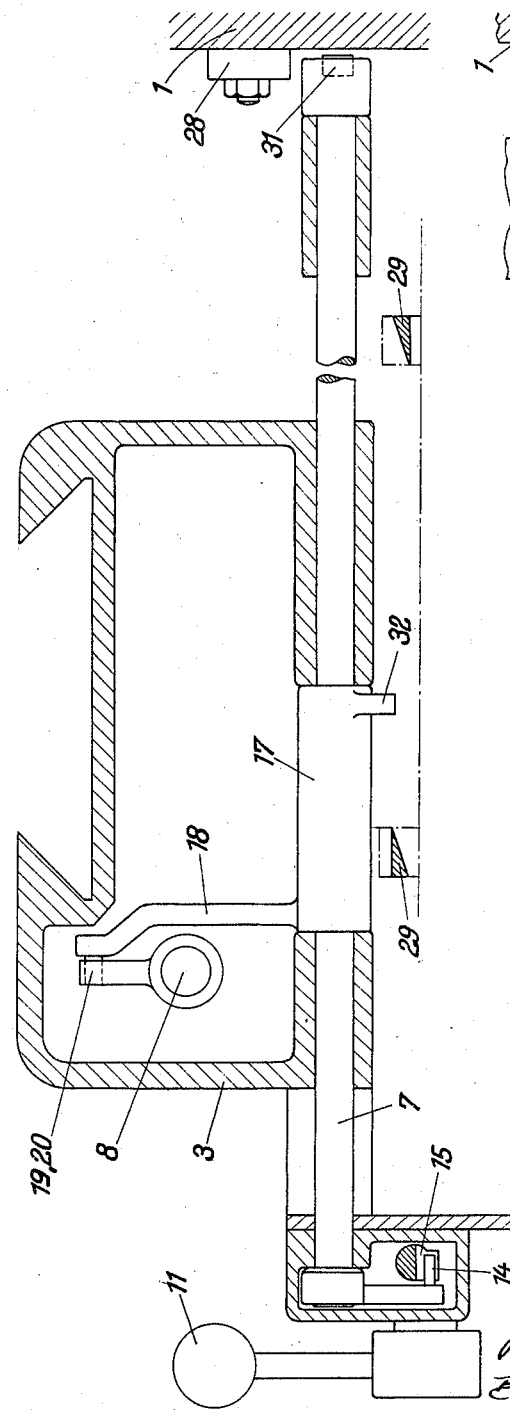
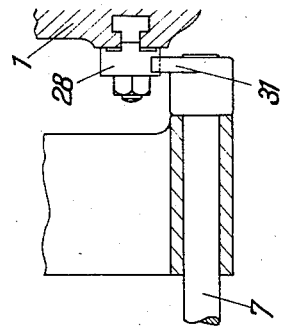
Inventor:
Rudolf Schulz Patented Apr. 4, 1939

2,153,101

UNITED STATES PATENT OFFICE 2,153,101

CONTROL DEVICE FOR MACHINE TOOLS

Rudolf Schulz, Chemnitz-Siegmar, Germany, assignor to Biernatzki & Co., Chemnitz, Germany, a joint-stock company of Germany Application October 27, 1937, Serial No. 171,355
In Germany November 3, 1936

8 Claims. (Cl. 90—21)

The invention relates to a control device for machine tools having a work table and/or tool holder, copying attachment support, dial micrometer holder or the like, making movements in different directions.

The object of the invention is to provide a simplification of the control device, this being secured by the fact that when using a mechanical or electrical direction selector for imparting the drive to the different movements of the table and/or tool holder, the control stops of the machine tool for the various movements of the table and/or tool holder or the like act through intermediate lever systems upon the same electrical controller drum for the variation in speed and for the reversal of the working stroke and quick-motion stroke.

In accordance with this construction of the control device according to the invention, a combined mechanical and electrical control of the machine tool is secured. Over purely mechanical control, this electromechanical control has the advantage of dispensing with a considerable number of mechanical detail parts for the control device. As compared with purely electrical machine tool control, the advantage is secured that a single electrical controller drum is sufficient, resulting in a corresponding reduction in the number of switches, while heretofore, in the case of purely electrical control, it has been necessary to employ several switches with relays and so forth, for example, even for controlling a work table in one direction of movement.

A further feature of the invention is that all the intermediate lever systems are connected to a common lever for manual adjustment of the controller drum. This arrangement has the advantage that the speed and the reversal of the working stroke and quick-motion stroke are effected by hand by means of a single lever, quite irrespective of the kind of table and/or tool holder movement to which the direction selector is adjusted at the time. Furthermore, the lever intended for manual adjustment is brought into the position corresponding to the particular adjustment of the intermediate lever system, thereby securing the advantage that the attendant can tell the particular adjustment of the machine at a single glance from the position of the hand lever in conjunction with index marks on the machine housing or the like and in conjunction with the adjustment of the direction selector.

An arrangement of a control device according to the invention in the case of a milling machine, the work table of which is movable in three different directions, is shown by way of example in the accompanying drawings, wherein:

Figure 3 is a perspective diagrammatic view of the control device according to the invention.

Figure 4 is a front elevation of the control device in section on lines IV—IV of Figure 5 and IV—IV of Figure 6.

Figure 5 is a part sectional side elevation of the control device in section on the line V—V of Figure 4.

Figure 6 is a plan corresponding to the part views shown in Figures 4 and 5.

Figure 7 is a side elevation of Figure 4 seen at right-angles to that figure.

Figure 8 is a plan of that part of the control lever system shown on the right in Figure 7.

Figure 1:
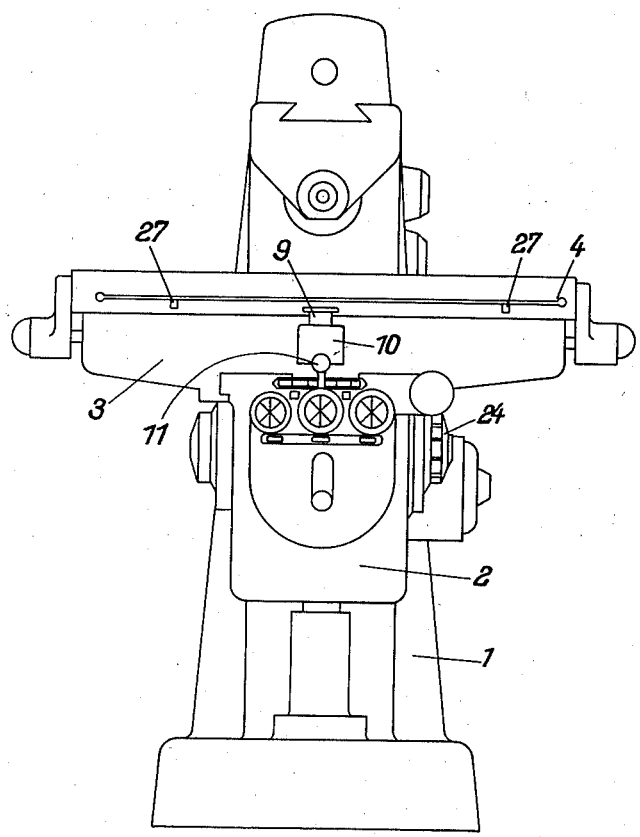
Figures 1 and 2 show a milling machine in front elevation and side elevation respectively.

In the milling machine (Figures 1 and 2) are shown the column 1, knee 2, cross slide 3 and work table 4. Mounted in the knee 2 are the principal parts of the control device denoted by 5, 6 and 7 in Figures 3 and 4, while the principal parts 8, 9 and 10 of the control device are mounted in the cross slide 3 (see Figure 6). The part 5 is connected to a hand lever 11 and is provided with teeth 12 meshing with teeth 13 provided on the bar 6. If the lever 11 is operated, the bar 6 is moved in the direction of its axis according to the arrows 13'. This axial movement of the bar 6 is converted, by means of a pin and slot connection 14, 15 provided between the parts 6 and 7, into a turning movement of the shaft 7 according to the arrows 16. This turning movement of the shaft 7 is again converted, by means of a sleeve 17 surrounding it, with lever 18, and by a pin and slot connection 19, 20 provided between lever 18 and bar 8, into an axial movement of the bar 8 according to the arrows 21, which again is converted by means of a pin and slot connection 22, 23 into a turning movement of the controller drum 9, which co-operates with electric contacts or the like situated in the part 10.

From the preceding description, it follows that operation of the hand lever 11 produces a turning movement of the electrical controller drum 9. The electrical switching arrangement provided in the part 10 co-operates with a mechanical or electrical direction selector 24 (Figures 1 and 2) on the knee in such a manner that if the direction selector 24 is set for a longitudinal movement of the work table, by moving the lever 11 to a predetermined position, a speed of the work table corresponding to that position or stoppage of the work table is obtained.

Figures 3 and 4 each indicate five different positions of the lever 11. If the lever 11 is at the position marked H, no movement of the work table takes place, while if the lever 11 is in the position VR or ER, the machine is set for working stroke to the right or quick motion stroke of the work table to the right. Correspondingly, if the lever 11 is set in the positions VL and EL, the machine is adjusted for working stroke to the left or for quick-motion stroke of the work table to the left. If the direction selector is set for transverse movement of the cross slide, then according to the particular setting of the lever 11, there will be obtained either no movement of the cross slide at all, or a quick-motion stroke or working stroke of the cross slide from the rear to the front or a quick-motion stroke or working stroke from the front to the rear. Analogously, if the direction selector is set for vertical movement of the knee 2, then according to the position of the lever 11 there will be no movement of the knee at all or a working stroke or quick-motion stroke from above downward or a working stroke or quick-motion stroke from below upward.

Figure 2:
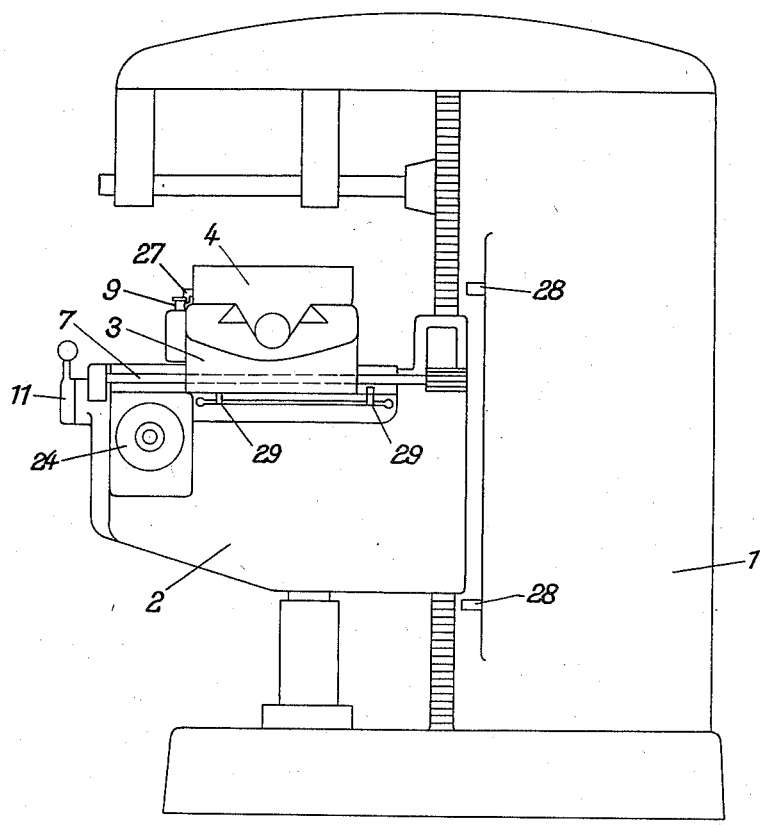

As follows from the foregoing, by employing the control device according to the invention in combination with a direction selector known per se, that is, a direction selector such as is described on pages 25 and 26 with reference to Figure 1 of "Loewe-Notizen" of January–March 1935, a variable control of the work table movable in three directions at right-angles to one another is obtained by operating a single hand lever 11.

As already stated in the foregoing, the parts 6 and 7 are mounted in the knee 2 (Figure 6), while the parts 8, 9 and 10 are mounted on the cross slide 3 (Figure 6). Since the cross slide makes a movement transversely of the knee, the sleeve 17 with the lever 18 must be adapted to slide axially on the shaft 7. The sleeve 17 is secured against rotation on the shaft 7 by means of a slot 25 provided in the shaft 7 and a key 26 provided on the sleeve 17.

For the automatic control of the movements of the work table, there are arranged on the work table for example two control stops 27 (Figure 6), on the column 1 for example two control stops 28 (Figure 8) and on the knee 2 for example two control stops 29 (Figure 7).

If the direction selector is set for longitudinal movement of the work table 4, the control stops 27 of the work table, in the appropriate position of the latter, will abut against counter-stops 30 (Figure 6) directly connected to the controller 9, whereby the controller drum 9 is moved into the corresponding position and, in combination with the direction selector, the corresponding control of the speed of the work table is obtained. A corresponding control of the vertical movement of the knee 2 and hence of the work table 4 is obtained by the fact that counter-stops 31, provided on the shaft 7, abut against the control stops 28 provided on the column.

If the direction selector is set for a transverse movement of the cross slide, the counter-stop 32 provided on the sleeve 17 moves into abutment against control stops 29 (Figure 7) which, like the control stops 28, effect a turning movement of the shaft 7 and hence a turning movement of the controller drum 9. From the foregoing description, it will be appreciated that, even in the case of the automatic control of the machine tool, the desired speed changes in the particular direction of movement of the work table are obtained by means of the control device according to the invention with the aid of a single controller drum. The movements produced by the control stops in the control device also result in each case in an axial movement of the bar 6 which, since it meshes by means of teeth 13 with teeth 12 on part 5 connected to the hand lever 11, also produces a movement of the lever 11, said lever 11 according to the nature of the control, being brought into a position corresponding to said control, so that the machine attendant may see at a glance from the particular position of the lever 11, in conjunction with the likewise visible setting of the direction selector 24, the nature of the particular movement adjusted for the machine tool.

The control device having been explained with general reference to all the figures, but with particular reference to the diagrammatic illustration of Figure 3, a detailed description of Figures 4 to 8 would not appear necessary. It will merely be mentioned that according to Figure 4, use is made of a locking device in the form of a catch ball 34, which is under the pressure of a spring 33 and which holds the bar 6 in the particular position adjusted.

In the control device according to the invention, it should also be noted that by suitably turning the hand lever 11 or by a suitable form of the control stops, a change of speed and a reversal of the working stroke or of the quick-motion stroke may be effected simultaneously. Thus for example, if the selector switch is set for longitudinal movement of the work table, it is possible to pass directly from a working stroke to the right to a quick-motion stroke to the left.

The control device according to the invention is not limited to its use in milling machines, but it may also be employed for other machine tools. It is furthermore not necessary for all the control operations to result ultimately in a turning movement of the controller drum, but cases are also conceivable in which by means of the intermediate lever system, the controller drum makes an axial movement or a turning movement and an axial movement.

I claim:

1. A control device for machine tools comprising a reciprocating work table, a transversely movable slide carrying said table, a vertically movable knee carrying said slide, a direction selector for distributing movements to the table, slide and knee, control stops for the different movements of the table, slide, and knee, intermediate lever systems and an electrical control drum, the control stops acting through said intermediate lever systems on the drum for varying the direction of movement, or the direction of movement and the speed of the table, slide and knee.

2. A control device for machine tools comprising a reciprocating work table, a transversely movable slide carrying said table, a vertically movable knee carrying said slide, a direction selector for distributing movements to the table, slide and knee, control stops for the different movements of the table, slide, and knee, a common hand lever, intermediate lever systems and a control drum, the control stops and hand lever acting through the intermediate lever system on the controller drum respectively for varying the direction of movement, or the direction of movement and the speed of the table, slide, and knee either automatically or manually.

3. A control device for machine tools comprising a reciprocating work table, a transversely movable slide carrying said table, a vertically movable knee carrying said slide, a direction selector for distributing movements to the table, slide and knee, control stops for the different movements of the table, slide and knee, intermediate lever systems and a rotatable electrical control drum, the control stops acting through said intermediate lever systems to rotate the electrical control drum for varying the direction of movement or the direction of movement and the speed of the table, slide and knee.

4. A control device for machine tools comprising a reciprocating work table, a transversely movable slide carrying said table, a vertically movable knee carrying said slide, a direction selector for imparting drive to the table in three directions at right angles to one another, control stops and a shaft mounted longitudinally of the knee, the control stops acting on the shaft for controlling the various strokes of the work table.

5. A control device for machine tools comprising a reciprocating work table, a transversely movable slide carrying said table, a vertically movable knee carrying said slide, a direction selector for imparting drive to the table, control stops and a control drum, the control stops being provided on the work table and acting directly on the controller drum for controlling the movements of the work table in the longitudinal direction.

6. A control device for machine tools comprising a work table and a tool holder, the one movable relatively to the other, a direction selector for selecting the relative movements between the work table and the tool holder, control stops for limiting the relative movements between the work table and the tool holder, intermediate lever systems, and an electrical control drum, the control stops acting through said intermediate lever systems on the drum for varying the direction of the relative movements between the work table and the tool holder.

7. A control device for machine tools comprising a reciprocating work table, a tool holder, a transversely movable slide carrying said table, a vertically movable knee carrying said slide, a direction selector for selecting the relative movements between the work table and the tool holder, control stops for limiting the relative movements between the work table and the tool holder, intermediate lever systems, and an electrical control drum, the control stops acting through said intermediate lever systems on the drum for varying the direction of the relative movements between the work table and the tool holder.

8. A control device for machine tools comprising a work table and a tool holder, the one movable relatively to the other, a direction selector for selecting the relative movements between the work table and the tool holder, control stops for limiting the relative movements between the work table and the tool holder, intermediate lever systems, and an electrical control drum, the control stops acting through said intermediate lever systems on the drum for varying the direction of the relative movements between the work table and the tool holder, and a hand lever acting through said intermediate lever systems on the controller drum for varying the direction of movement, or the direction of movement and the speed of the relative movements between the work table and the tool holder.

RUDOLF SCHULZ.